United States Patent [19]
Thompson

[11] Patent Number: 5,861,608
[45] Date of Patent: Jan. 19, 1999

[54] EDM CUTTING MACHINE FOR PRECISION NOTCHING TUBULARS

[75] Inventor: Carroll R. Thompson, The Woodlands, Tex.

[73] Assignee: ICO, Inc., Houston, Tex.

[21] Appl. No.: 744,997

[22] Filed: Nov. 7, 1996

[51] Int. Cl.⁶ .............................. B23H 1/00; B23H 7/26; B23H 9/00
[52] U.S. Cl. .......................... 219/69.2; 219/69.11
[58] Field of Search ................. 219/69.11, 69.2, 219/69.17

[56] References Cited

U.S. PATENT DOCUMENTS

| | | | |
|---|---|---|---|
| 2,263,412 | 11/1941 | Armentrout | 219/69.17 |
| 3,318,793 | 5/1967 | Webb . | |
| 3,610,865 | 10/1971 | Van Osenbruggen . | |
| 4,162,383 | 7/1979 | Hamasaki . | |
| 4,439,659 | 3/1984 | Shimizu . | |
| 4,476,368 | 10/1984 | Cammann et al. . | |
| 4,948,933 | 8/1990 | Thompson | 219/69.2 |
| 5,317,607 | 5/1994 | Formanek | 219/69.2 |
| 5,543,599 | 8/1996 | Cole et al. | 219/69.2 |
| 5,569,393 | 10/1996 | Reinhart et al. | 219/69.2 |
| 5,616,259 | 4/1997 | Habel et al. | 219/69.2 |

*Primary Examiner*—Geoffrey S. Evans
*Attorney, Agent, or Firm*—Browning Bushman

[57] ABSTRACT

A notch cutting machine 10 cuts a precision notch in an oilfield tubular according to API specifications. The machine includes a base 12 for positioning either within the tubular for cutting an internal notch, or on the outer surface of the tubular for cutting an external notch. An electrically powered servo motor 14 is mounted on the base for rotating a motor shaft 21, and a linear translator 16 linearly moves a support block 18 a preselected distance in response to a selected rotation of the shaft. An electrode 22 has a tip surface 23 configured for cutting the notch in a tubular. The electrode is fixed with respect to a head 20 by an air responsive holder 80, and pressure to the head may be briefly terminated so that tip surface 23 comes into planar engagement with the surface of the tubular to be notched. An electrical source 24, a pressurized air source 28, and an EDM oil source 32 provide power, air pressure, and an EDM oil coolant, respectively, to operate the notch cutting machine.

21 Claims, 5 Drawing Sheets

EDM CUTTING MACHINE FOR PRECISION NOTCHING TUBULARS

FIELD OF THE INVENTION

The present invention relates to methods and apparatus for electrical machining a workpiece. More particularly, this invention relates to improved equipment and techniques for cutting a precision notch in an elongate metal oilfield tubular. The precision notch in the tubular facilitates calibration of tubular inspection equipment, which is then used to test or inspect a plurality of elongate tubulars.

BACKGROUND OF THE INVENTION

Electrical machining techniques utilize an electrode spaced closely adjacent a workpiece so that pulsed electrical current is passed between the electrode and the workpiece through a small gap, thereby machining the workpiece. A series of time-spaced, discrete electrical discharges created across the machining gap thus erosively remove material from the workpiece. The high current density discharges across the gap commonly occur at sonic or ultrasonic frequencies and in the presence of a dielectric fluid which fills the gap during the machining process. More particularly, electrical machining generally includes electrical discharge machining (EDM), electrochemical machining (ECM), electrochemical-discharge machining (ECDM), and other machining processes which utilize electroerosive techniques to machine material from a workpiece.

U.S. Pat. Nos. 3,318,793 and 3,610,865 disclose electrical machining techniques developed in the 1960s and the 1970s. The '793 patent discloses an electrohydraulic servo feed system which allegedly has advantages over a hydraulically actuated servo feed system for moving the electrode with respect to the workpiece. An EDM cutting machine which immerses the electrode in a liquid bath is disclosed in the '865 patent. U.S. Pat. No. 4,439,659 discloses apparatus for electrical machining a work surface. The system includes a gap-sensing circuit with the electrode being emersed in a liquid dielectric bath, and a servo motor for moving the electrode.

Precision notches may be cut in a oilfield tubular for the purpose of calibrating ubular inspection equipment. Specifics regarding notches for calibrating the inspection equipment are standardized by the American Petroleum Institute (API), and each notch generally has a length substantially greater than the width. Both the depth of the cut notch and the length and width of the notch are carefully controlled in order to reliably calibrate both electromagnetic and sonic inspection equipment. Also, API specifications have mandated that notches be cut at different orientations with respect to the axis of the tubular, with some of the notches being aligned with the axis of the tubular, other notches being traverse to the axis of the tubular, and still other notches being at preselected angles with respect to the axis of the tubular.

U.S. Pat. No. 4,162,383 discloses a machine for cutting the inside of a tubular utilizing oxy-arc techniques. A plurality of claws and rollers are provided for positioning the equipment within the tubular. U.S. Pat. No. 4,476,368 discloses a disintegrator arc tool for cutting the interior wall of a tubular as the tool moves an electrode toward and away from a work surface. Electrical voltage is supplied to the electrode for performing the electrical machining operation, and a non-conductive emersion fluid is supplied for filling the gap between the electrode and the work surface. U.S. Pat. No. 4,948,933 discloses another machine for cutting the interior surface of a tubular. An articulated arm mechanism and a force rod are disclosed in one embodiment for selectively positioning the electrode within the tubular, while a hydraulic technique involving a master cylinder and a slave cylinder are disclosed in an alternate technique for positioning the electrode within the tubular. The electrode may be rotated to any desired angular relationship with respect to the axis of the tubular. In one embodiment, a jaw mechanism is provided for releasably gripping the electrode. In another embodiment, a biasing spring and detent balls are provided for allowing the electrode to move relative to its support.

When used for cutting precision notches on the interior or the exterior of an oilfield tubular, the above equipment is expensive to manufacture and difficult to maintain. The equipment is also complex, and a good deal of training and expertise is required to properly operate the equipment. When the surface of the tubular to be precision cut is irregular or slightly corroded, the tool may not cut the desired API specified notch in the tubular. Accordingly, the notch cutting and calibration process may have to be repeated several times. Particularly when the notch is cut in the interior of the tubular, the operator may not be able to determine that an improper notch has been cut, and accordingly the test equipment calibration may be incorrect. Even with a proper API notch cut in an oilfield tubular surface by an experienced operator, a large amount of operator time is required to cut the notch, thereby increasing the cost of the inspection calibration operation.

The disadvantages of the prior art are overcome by the present invention, and improved equipment for cutting precision notches in both the interior surface and exterior surface of an elongate metal tubular is hereinafter disclosed. Those familiar with prior art equipment and techniques for cutting precision notches in tubulars have long sought and will appreciate the advantages of the present invention, as hereinafter disclosed.

SUMMARY OF THE INVENTION

The notch cutting machine of the present invention is particularly intended for cutting a precision notch in accord with API specifications in either an interior surface or an exterior surface of an oilfield tubular, so that the notch may subsequently be used to calibrate an electromagnetic, ultrasonic, or other type of tubular inspection equipment. The notch cutting machine is compact and relatively inexpensive, and may be easily and reliably operated with less operator time compared to prior art equipment, thereby effectively reducing the cost of providing a precision notch and thus the test equipment calibration operation.

According to an exemplary embodiment, the notch cutting machine includes a base for positioning on the surface of the tubular at a location adjacent where the notch is to be cut. The lower surface of the base may be configured for planar engagement with the curved interior or exterior surface of the tubular. An electrically powered servo motor mounted on the base rotates a shaft. A gear reducer interconnects the motor shaft with a linear translator, which includes a cam mechanism for radially moving the electrode a preselected distance in response to a preselected rotation of the motor shaft. The electrode has a tip surface configured for cutting the preselected notch in the surface of the elongate tubular. Electrical power is supplied from a remote location for providing pulsed current to the electrode.

The electrode may be supported on an electrode head, which in turn is selectively positionable in one of a plurality of fixed orientation positions relative to the radially movable electrode support. An adjustment screw is provided for linearly or radially adjusting the position of the electrode head with respect to the electrode support. A pressurized air line supplies fluid pressure to a toroidal bladder which secures the position of the electrode with respect to the electrode head. Once the electrode is positioned at the desired location with respect to the surface of the tubular for cutting the notch, air pressure to the toroidal bladder may be released, thereby allowing the electrode to fall slightly in response to gravity so that the tip surface of the electrode is aligned for planar engagement with the surface of the tubular to be cut. Thereafter, air pressure may be returned to the bladder to fix the position of the electrode with respect to the head. The servo motor is then powered to raise the curved surface of the electrode a desired spacing from the work surface, so that a uniform gap will be formed between the electrode and the work surface. A liquid line for passing a coolant to the area adjacent the tip surface of the electrode may pass coolant through the electrode support for discharge onto the work surface.

It is an object of the present invention to provide an improved notch cutting machine for cutting a precision notch in either an interior or exterior surface of an oilfield tubular in a manner whereby the effective cost of cutting the notch may be reduced compared to prior art machines. More particularly, an operator may simultaneously control the operation of multiple notch cutting machines according to this invention, with each machine being powered to cut a selected precision notch in an oilfield tubular.

It is also an object of this invention to increase the reliability of cutting a precision notch conforming to API specifications, such that reliability of the inspection calibration technique will be enhanced. According to the present invention, the tip surface of the electrode is radially movable relative to an electrode head so that the tip surface may become aligned for planar engagement with the work surface. Once aligned, the position of the electrode relative to the head may be fixed so that the desired gap between the tip surface of the electrode and the work surface is obtained. According to a preferred embodiment, the electrode is fixed to the electrode head by applying fluid pressure to a toroidal bladder which secures the electrode in place relative to the electrode head.

It is a feature of the invention that an operator may select a desired depth for the notch, and may thereafter monitor the cutting operation without actively controlling the depth of cutting. A computer program is provided for activating the motor to raise and lower the electrode at a desired frequency, and to position the electrode at a desired radial spacing with respect to the tubular surface for cutting the notch. An encoder is provided for monitoring the position of the electrode relative to the work surface, so that the cutting operation may be automatically terminated when the encoder determines that the electrode has cut the notch to a desired depth.

It is another feature of the invention that an improved mechanism is provided for radially raising and lowering the electrode with respect to the work surface. An electrically powered motor operates a cam mechanism which translates rotational movement of a motor shaft into linear movement of the electrode. A gear reducer may be provided between the cam mechanisms and the motor. An adjustment screw is also provided for selectively adjusting the radial position of the electrode with respect to an electrode head.

Still another feature of the invention is that the orientation of the electrode relative to the axis of the tubular may be fixed in a selected one of a limited number of positions. A plurality of passageways may be provided in the electrode head, and a securing bolt positioned within a selected passageway for securing the positioning of the electrode head with respect to the electrode support.

It is a significant advantage of the present invention that the same notch cutting machine may be used for cutting both an internal notch or an external notch in an oilfield tubular. Very little modification of the equipment is required in order that the same notch cutting machine may be used to reliably cut a notch in various sized oilfield tubulars.

A further advantage of the invention is that the machine base may be retained in a position relative to the tubular surface by relying either upon the weight of the machine base and/or upon an electromagnetic to selectively fix the machine base in place either on or within the oilfield tubular.

These and further objects, features, and advantages of the present invention will become apparent from the following detailed description, wherein reference is made to the figures in the accompanying drawing.

DETAILED DESCRIPTION OF THE PREFERRED EMBODIMENTS

Figure 1:
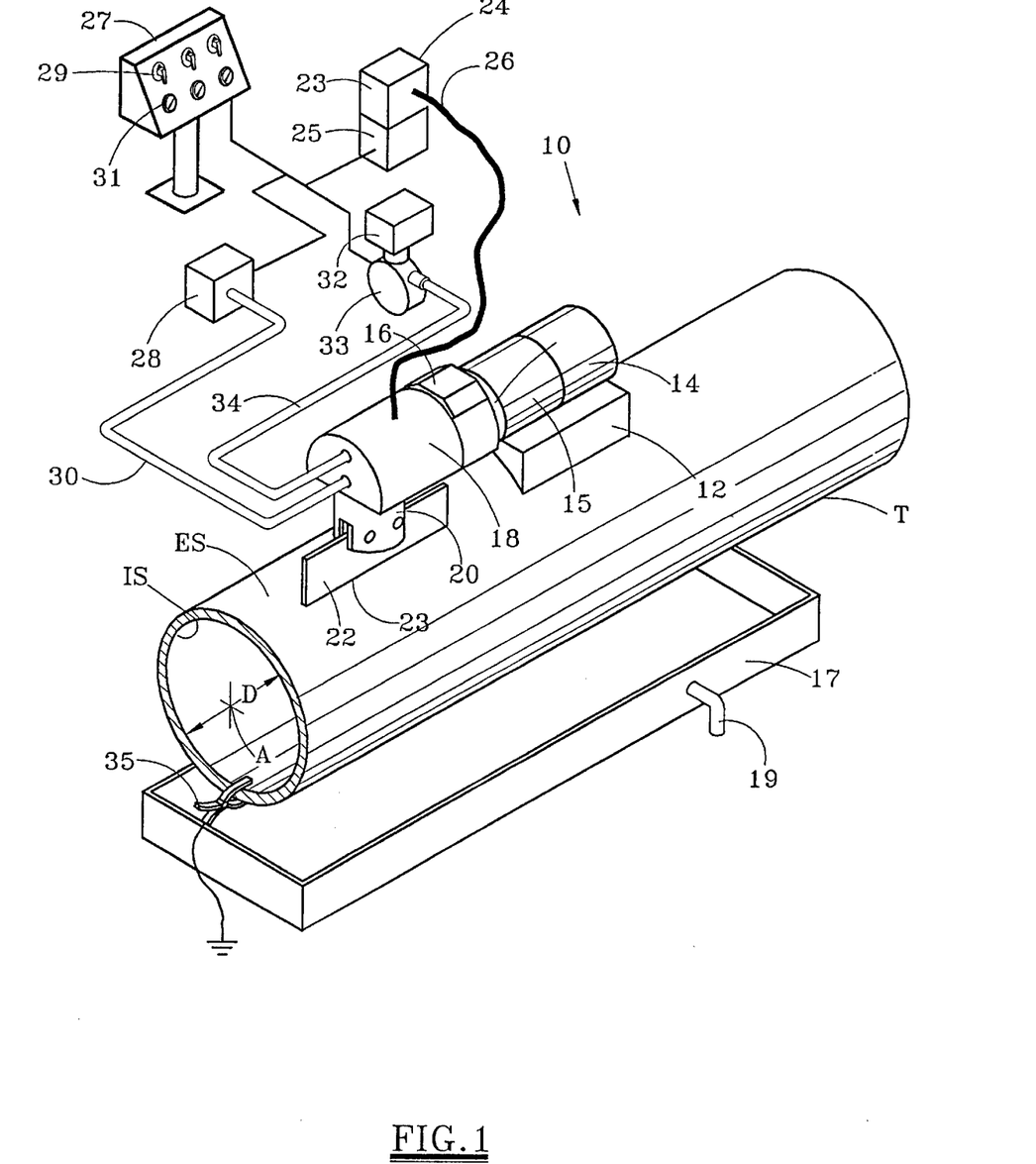
FIG. 1 is a simplified pictorial view of the notch cutting machine according to the present invention positioned on the exterior of an oilfield tubular.

An EDM notch cutting machine for cutting a precision notch in an elongate metal oilfield tubular T is generally shown in FIG. 1. The notch cutting machine as described herein may cut a precision notch on either an interior surface IS or an exterior surface ES of the tubular T, and is depicted in FIG. 1 for cutting a notch on the exterior surface of the tubular. The tubular T typically has a length of approximately 10 meters, and may be casing, tubing, or drill pipe having an internal diameter D ranging from about 4.3 cm to about 5.0 cm or more. Since the notch cutting machine fits within a tubular to cut an internal notch, the size of the smallest tubular is limited by the size of the machine. The same machine may, however, cut an external notch in any size tubular, and may cut an internal notch on any tubular greater than the minimum size. The same notch cutting machine with a replaceable base may be used for cutting notches in various sized tubulars and on either the interior or the exterior surface of the tubular. The notch is cut according to API specifications, and is used to calibrate tubular inspection equipment, which in turn may rely upon electromagnetic, ultrasonic, and/or other well known inspection techniques to detect defects in the oilfield tubulars. A typical notch cut by the machine is approximately 2.0 cm long, 0.9 mm wide, and from 0.5 to 2.0 mm deep. The notch may be cut so that its length is parallel to, perpendicular to, or a preselected angle relative to the axis A of the tubular T, as described subsequently.

The primary components of the notch cutting machine 10 as shown in FIG. 1 include an alignment block or machine base 12, an electrically powered servo motor 14 mounted on the base 12, a gear reducer 15, a linear translator 16, an electrode support 18, an electrode head 20, and an electrode 22. The base 12 may be positioned along the exterior surface of the tubular T at a selected location adjacent where the notch will be cut. The gear reducer 15 allows numerous turns of the motor shaft to result in only a selected angular rotation of the output shaft of the gear reducer, and typically results in a reduction of about 1600:1. The linear translator 16 moves the electrode support 18 a preselected radial distance toward or away from the exterior surface ES of the tubular T in response to rotation of the motor shaft. The electrode head 20 is mounted on support 18, and electrode 22 in turn is mounted on the head 20. Electrode 22 has a tip surface 23 configured for planar engagement with the surface of the tubular to be notched. A holder as described subsequently releasably supports the electrode 22 within the head 20.

A power source 24 is provided for both supplying DC power via flexible line 26 to the motor 12 and for supplying electrical power to the electrode 22 for performing the electrode machining operation. The power source 24 may consist of a conventional converter 23 for converting AC power to DC power for driving the motor 12, and a transformer 25 for supplying high current pulses of DC power to the electrode 22. A compressed air source 28, which may consist of either a conventional compressed air line within the facility housing the machine 10 and/or an air compressor, supplies fluid pressure via flexible line 30 to the electrode holder, as described subsequently. EDM oil source 32 and pump 33 provide coolant via line 34 to the electrode head 22. A clamp and ground line 35 may be used to conventionally ground the tubular T during the cutting operation. Catch pan 17 and fluid return line 19 are provided for collecting and returning the EDM oil to the source 32. An operator control panel 27 is provided with conventional controls 29 and lights and/or gauges 31 for controlling and monitoring the EDM cutting operation.

Figure 2:
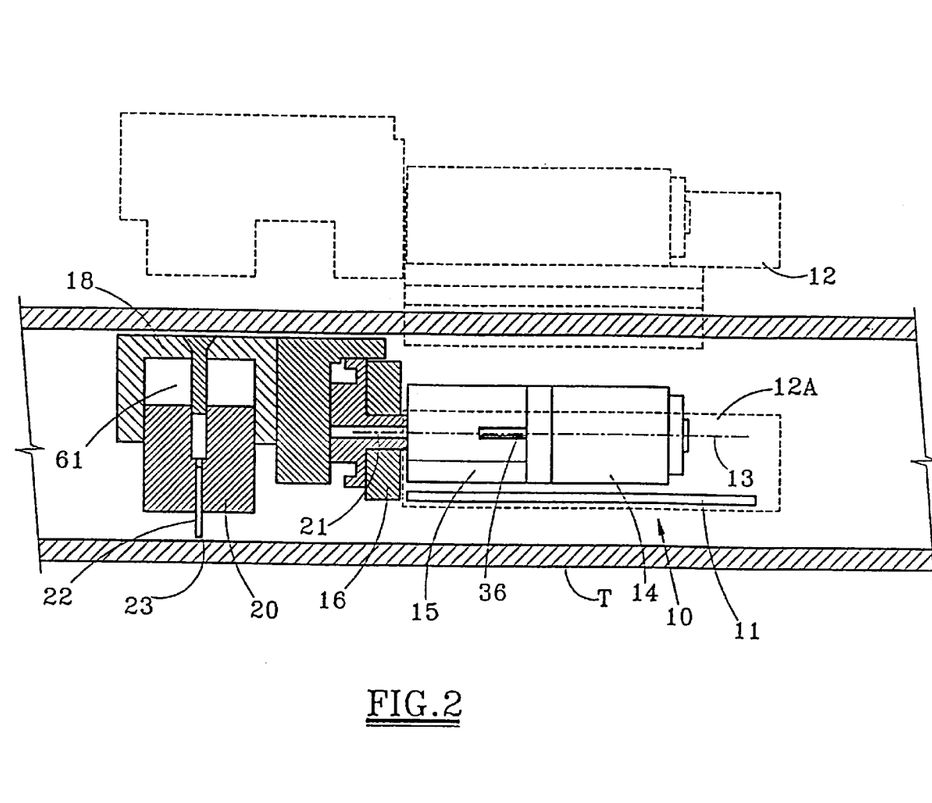
FIG. 2 is a simplified cross-sectional view of the notch cutting machine positioned within a tubular, with substantially the same machine as shown in FIG. 1 being shown in dashed lines on the exterior surface of the tubular.
Figure 3:
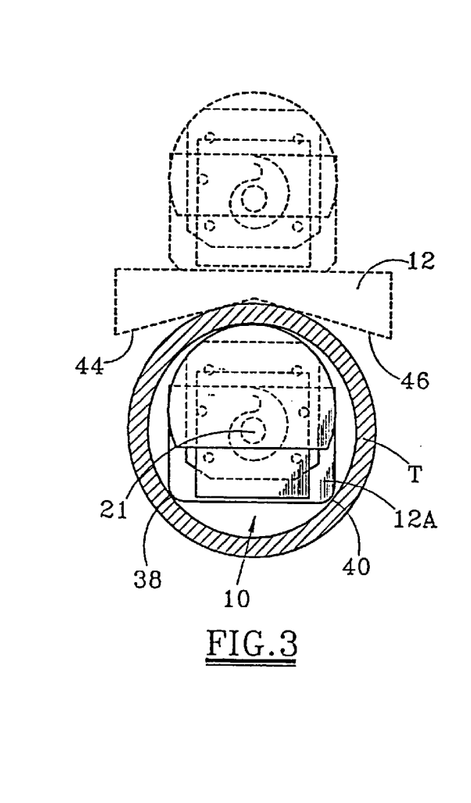
FIG. 3 is an end view of the notch cutting machine shown in FIG. 2.

FIGS. 2 and 3 depict side and end views, respectively, of machine 10 according to the present invention positioned within a tubular T for cutting an internal notch. The general outline of substantially the same machine is shown in dashed lines for cutting a notch on the exterior of the tubular T. Only the alignment block or base 12 of the machine as shown in FIG. 1 for cutting an external notch need be removed and replaced with base 12A so that substantially the same machine may cut an internal notch within a tubular. In many applications, it should be understood that the electrode 22 will also be replaced to cut a different notch rather than the notch cut in the prior EDM notch cutting operation, particularly since the tip surface of the electrode is configured for planar engagement with the surface to be cut, as explained below.

FIG. 2 depicts motor shaft 36 of the servo motor 14 which drives the gear reducer 15, which in turn rotates the output shaft 21 for driving the linear translator 16. Both shafts 36 and 21, as well as the motor 14 and the gear reducer 15, are generally concentric about motor axis 13. Electrode 22 is generally depicted on head 20 as shown in FIG. 2, and will be described in further detail subsequently. Machine base 12A for positioning within the interior of the tubular T includes spaced apart curved support surface 38 and 40 as shown in FIG. 3, and generally positions the head 20 a selected distance from the surface to be cut. The machine base 12A may be temporarily fixed in position to support the components as shown in FIGS. 2 and 3 within the tubular T by gravity for cutting a notch in the lowermost surface of the tubular T. Alternatively, base 12A may include an elongate electromagnet 11 as shown in FIG. 2 so that electrical power may be supplied to the magnet 11 for fixing the position of the base 12A within the tubular.

FIG. 3 also depicts the general configuration of the machine base 12 positioning on the exterior surface of the tubular for cutting an exterior notch in the tubular T. Those skilled in the art will appreciate that the taper of the lowermost surfaces 44 and 46 of the base 12 as shown in FIG. 3 allows the machine base 12 to be positioned on the exterior surface of various diameter tubulars. The machine 10 as shown in FIG. 3 is sized for positioning within a small diameter tubular T having an internal diameter at least 0.7 cm, and may also cut a notch within a tubular having a much larger diameter tubular in the range of about 50 cm.

Figure 4:
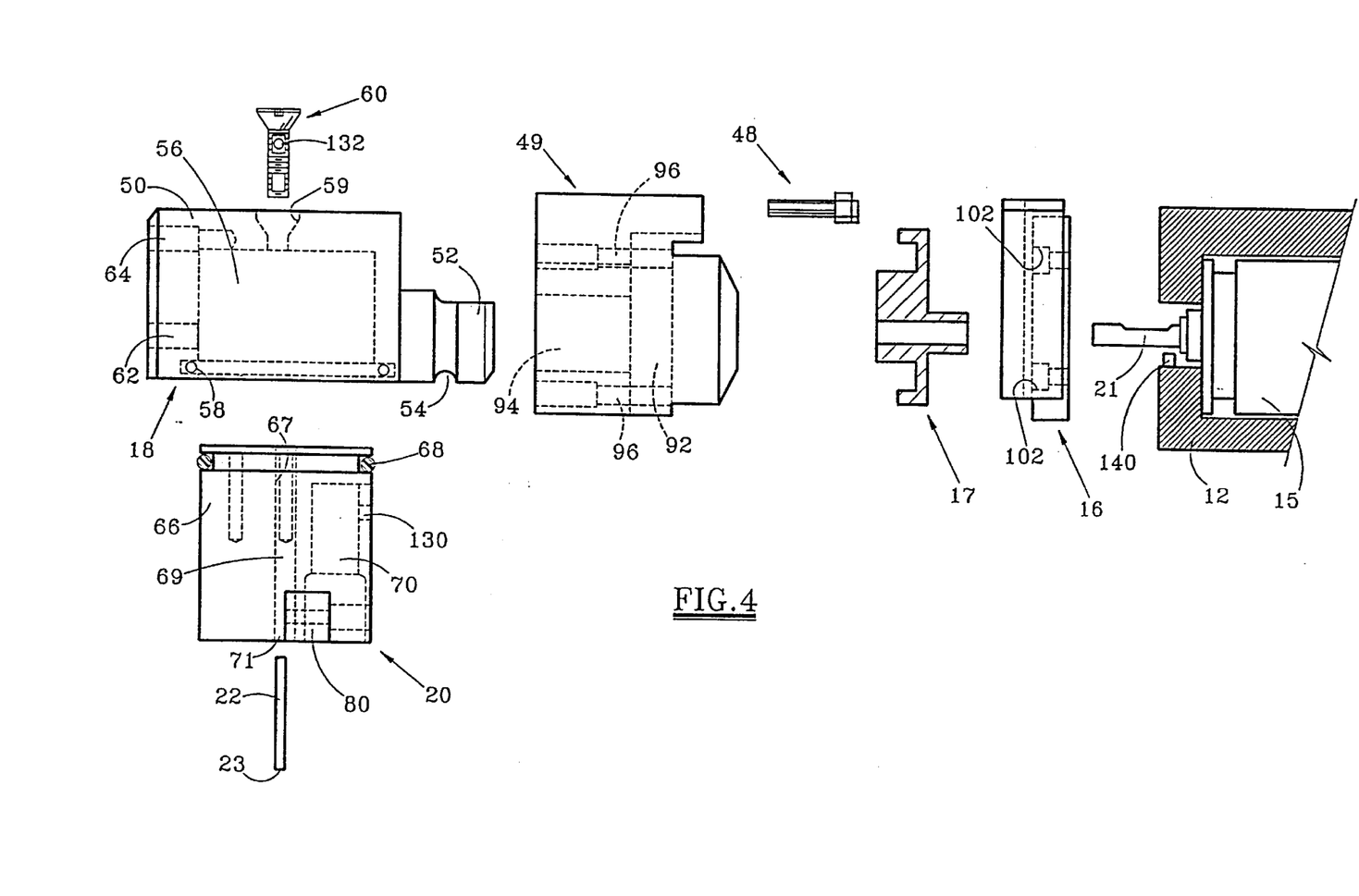
FIG. 4 is an exploded view of the primary components of the notch cutting machine as shown in FIGS. 1–3 between the gear reducer and the electrode.

FIG. 4 is an exploded view of the primary components of the notch cutting machine 10 downstream from the gear reducer 15. Output shaft 21 from the gear reducer passes into the linear translator 16 and into cam lobe 17, which is described in further detail subsequently. A cam follower assembly 48 and adapter block 49 move radially toward and away from the surface of the tubular to be cut in response to rotation of the cam lobe 17 by the shaft 21. An electrode positioner block or support block 18 in turn is interconnected with the adapter block 49, and an electrode holder or head 20 fits within the block 18 as described subsequently. An electrode 22 fits within the electrode head 20, and is normally retained therein by holder 80.

Figure 5:
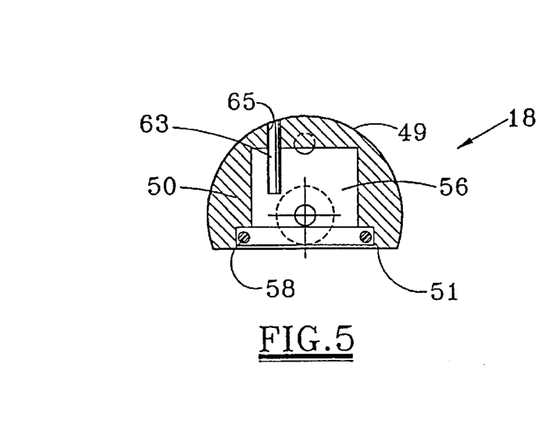
FIG. 5 is a detailed front view of an electrode support according to the present invention.
Figure 6:
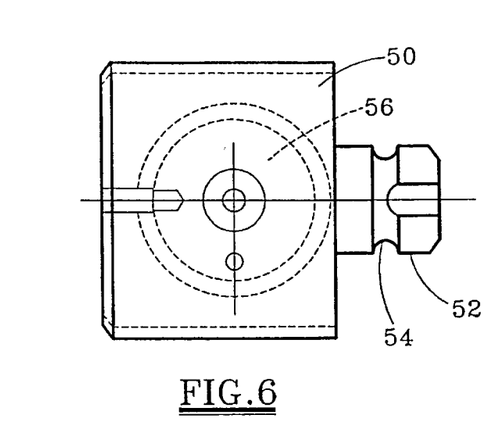
FIG. 6 is a top view of the electrode support shown in FIGS. 4 and 5.

FIGS. 4, 5, and 6 depict in greater detail the electrode support generally shown in FIGS. 1 and 2. The electrode support 18 includes support block 50 which, as shown in FIG. 5, has a generally dome-shaped upper surface 49 and a substantially lower planar surface 51. Support rod 52 is fixed to and projects outwardly from the support block 50, and includes a locking groove 54 for interconnecting the rod 52 to the adapter block 49. Support block 50 includes a generally cylindrical cavity 56 therein which extends downward through the lower surface 51 of the block 50. An annular groove is positioned for receiving O-ring 58 about the lower perimeter of the cylindrical-shaped cavity 56. Block 50 also includes a port 59 (see FIG. 4) for receiving adjustment screw 60 so that the vertical position of the cutting head 20 (radial position with respect to the tubular) within the cavity 56 may be adjusted, thereby altering the thickness of the gap 61 (see FIG. 2) between the top of the electrode head 20 and the top end surface of the cylindrical cavity 56. Referring to FIG. 5, a top port 65 in block 50 receives pin 63 which extends into cavity 56 to desirably orient the head 20 circumferentially within the support 18, as explained subsequently. Block 50 also includes air inlet port 62 for interconnection with the flexible line 34 shown in FIG. 1, and a coolant inlet port 64 for interconnection with the flexible line 30 shown in FIG. 1. FIG. 6 shows the generally cylindrical cavity 56 for receiving the head 20, and further details with respect to rod 52. The rod 52 may be interconnected with the block 49 by various mechanisms, including a conventional twist-and-lock mechanism.

Figure 7:
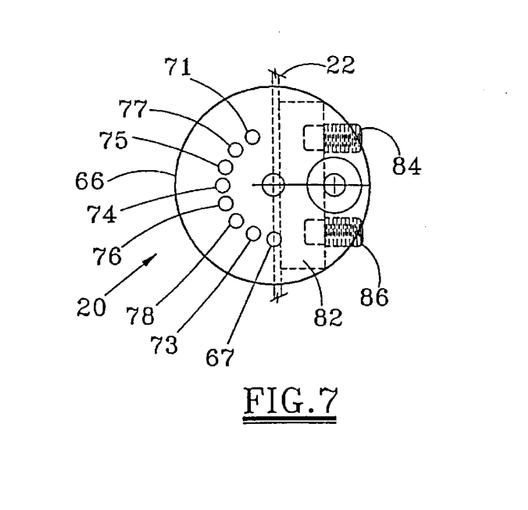
FIG. 7 is a top view of an electrode head and an electrode positioned thereon.
Figure 8:
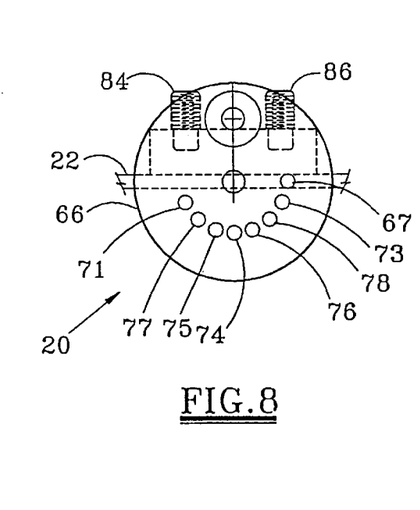
FIG. 8 is a top view of the electrode head in an alternate position from that shown in FIG. 7.

Referring to FIGS. 4, 7 and 8, electrode head 20 includes a generally cylindrical block 66 sized for fitting within the cylindrical cavity 56 within support block 50. Annular O-ring 68 is provided at the upper end of the block 66 for sealing engagement with the sidewall of the cavity 56 when the electrode head is positioned within the block 50. A threaded passageway 67 is provided in the block 66 for receiving the adjustment screw 60. Air passageway 130 is also provided within block 66 for transmitting compressed air from the port 62 to the pneumatic clamp 70, which activates the electrode holder 80 as described subsequently. O-ring seal 68 seals the EDM oil within gap or chamber 61 (see FIG. 2). EDM oil in cavity 61 flows through the passageway 132 in screw 60 (see FIG. 4) then through the port 69 in block 66, and is then discharged through the port 71 adjacent the electrode 22. The upper O-ring 68 also serves to seal between the block 50 and the block 66 for reliably transmitting compressed air through port 130 and to the pneumatic clamp 70 positioned within the block 66, as described subsequently.

FIGS. 7 and 8 shows top views of the electrode head 20, and also illustrates the position of the electrode 22 mounted on the block 20. When the adjustment pin 63 (see FIG. 5) is positioned within the alignment port 67 in the block 66 as shown in FIG. 7, electrode 22 will be positioned for cutting a transverse notch which has its length perpendicular with the axis A of the tubular T. Adjustment screw 60 may be unthreaded from port 67 and the electrode head lowered in cavity 56 then rotated 90° (in the clockwise direction looking down on FIG. 7) to the position as shown in FIG. 8, so that pin 63 is now aligned for insertion in the port 74. With the pin 63 in that position, the electrode 20 will then be in a longitudinal position for cutting a notch which is substantially perpendicular to the axis A of the tubular T. It is a feature of the present invention that additional passageways 75, 76, 77, 78, 71 and 73 are also provided in the head 20. When the pin 63 is positioned within port 75, electrode 22 will be positioned for cutting a notch orientated 22½ from the axis A of a tubular T, and when the pin is within the port 76, the electrode 22 will be positioned for similar cutting a 22½ notch on the opposite side from the axis of the tubular T. Similarly, when the pin 63 is positioned within the port 77, electrode 22 is positioned for cutting a notch at a 45° angle to the left of the axis A, and when the pin 63 is within the port 78, the electrode will cut a notch angled to the right at 45° relative to the axis A. Ports 71 and 73 are arranged for cutting a notch at an angle of 67½ on the left and right sides, respectively, of axis A. It is thus a feature of the present invention that a plurality of ports are provided in the electrode head each for receiving the adjustment pin 63 so that the electrode 22 will be at a selected angular orientation relative to the axis A of the tubular when the pin 63 is in a selected one of the ports.

Figure 9:
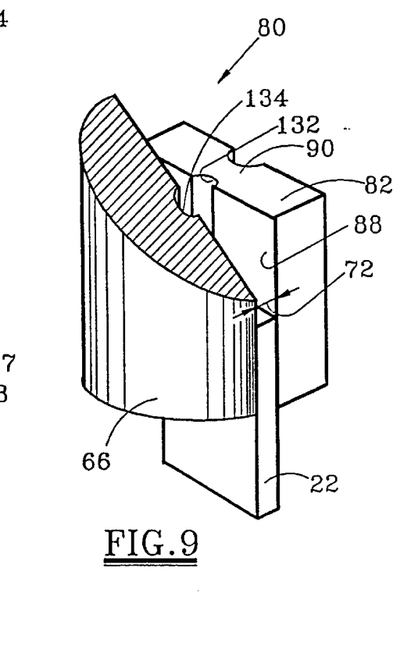
FIG. 9 is a pictorial view of the lower portion of the electrode head shown in FIGS. 4, 7 and 8.

Referring now to FIG. 9, the lower end of the electrode head 20 is shown with an electrode 22 mounted thereon. As previously explained, pneumatic clamp 70 in the block 66 is provided for applying mechanical pressure to holder 80, which comprises a bar 82 loosely mounted on the block 66 by a pair of bolts 84 and 86, as shown in FIGS. 7 and 8. The bolts 84, 86 allow the bar 82 to move relative to the block 66 in response to either rotation of the adjustment bolts 84 and 86, or in response to inflation of the pneumatic clamp 70, thereby changing the gap 72 between the bar 82 and the block 66 for receiving the electrode 22. Semi-cylindrical cavity 132 in the bar 82 and similar cavity 134 in block 66 ensure that oil will be transmitted to the cutting surface when the back surface 88 of the block pushes the electrode 22 tightly against block 66 in response to pressure to the pneumatic clamp 70. The front semi-cylindrical cavity 90 in the bar 82 is sized for receiving the clamp 70 such that, upon inflation of clamp 70, mechanical force is transmitted to the surface 90 for forcing the bar 82 to clamp the electrode in place, with the bolts 84 and 86 guiding movement of the bar 82 to ensure a reliable clamping force is applied to secure the position of the electrode 22 on the head 20. Prior to a cutting operation, the adjustment screws 84 and 86 are preferably positioned so that gravity will subsequently allow the electrode 22 to drop relative to the block 66 if air pressure is not supplied to the clamp 70. The actuation of air pressure to the clamp 70 is thus sufficient to move the bar 82 toward the block 66, thereby sandwiching the electrode 22 therebetween, as shown in FIGS. 7 and 8.

Figure 10:
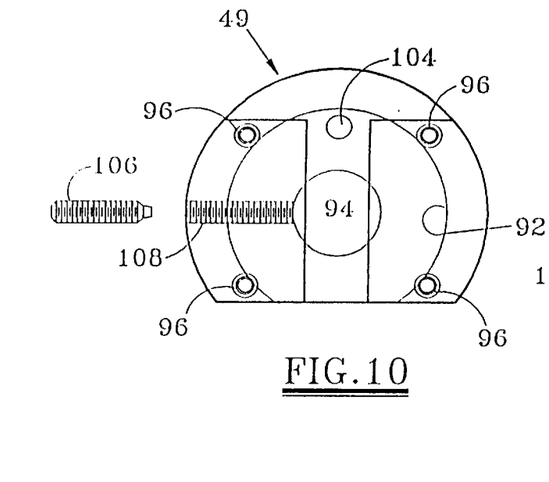
FIG. 10 is a front end view of the adapter block shown in FIG. 4.
Figure 11:
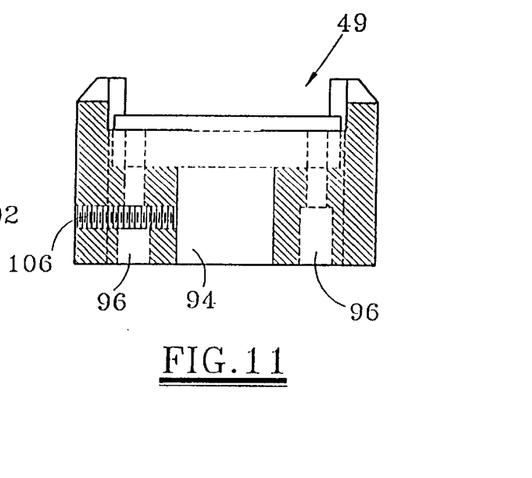
FIG. 11 is a cross-sectional view of the adapter block shown in FIGS. 4 and 10.

Referring now to FIGS. 4, 10 and 11, the adapter block 49 is shown with cavity 92 for receiving the rotatable cam lobe 17, and with a radial opposing cavity 94 for receiving rod 52 of support block 18. Four throughports 96 are provided and each sized for receiving a respective bolt (not shown) to threadably connect the block 49 to mating threads 102 in the linear translator 16. Throughport 104 as shown in FIG. 10 is sized for receiving the cam follower assembly 48. A bolt or pin 106 may be threaded within passageway 108 for cooperation with groove 54 to removably interconnect the support block 18 to the adapter block 49. Alternatively, a spring biased detent pin may be used instead of bolt 106. FIG. 11 depicts in cross-section the side view of the adapter block 49.

Figure 12:
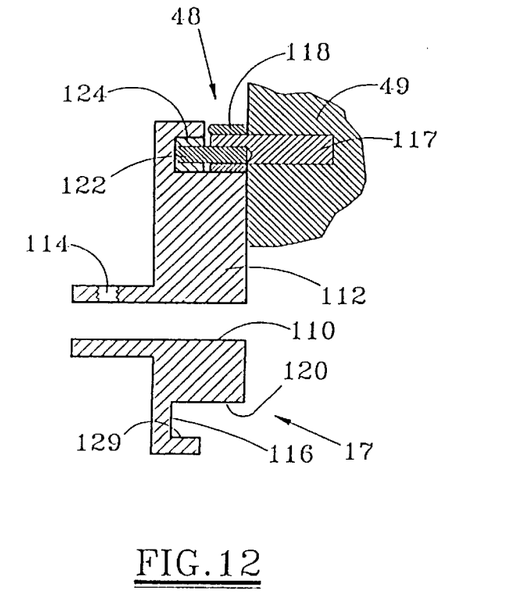
FIG. 12 is a cross-sectional view of the cam lobe and cam follower mechanism generally shown in FIG. 4.
Figure 13:
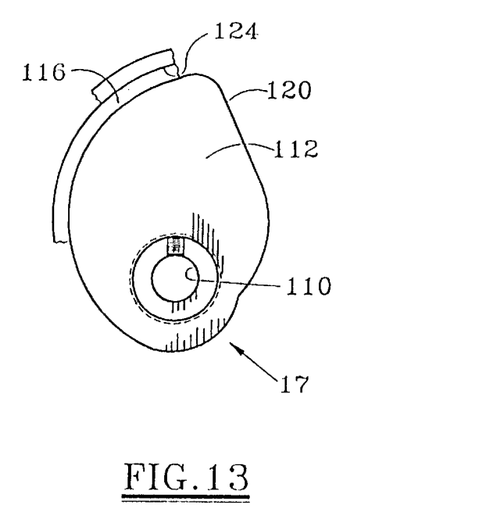
FIG. 13 is an end view of the cam lobe shown in FIG. 12.

FIG. 12 illustrates in greater detail the rotatable cam lobe 17 and the cam following assembly 48 for interconnecting the cam lobe 17 to the adapter block 49. The throughport 110 in the rotatable cam lobe body 112 is sized for receiving the output shaft 21 from the gear reducer 15. A conventional threaded port 114 is provided such that a set screw may lock the cam lobe to a flat provided on the shaft 21. The cam lobe includes an annular groove 116 which is sized for receiving the cam follower 48. The cam follower 48 includes a support pin 117 which is fitted tightly within a respective port in the adapter block 49. The roller 118 is positioned about the pin 117 and rides against the interior surface 120 in the annular groove 116. A small diameter pin 122 is pressed into a cavity provided in the pin 117, and a small roller 124 is mounted on the pin 122. The roller 124 thus rotates about the pin 122, and is sized for fitting within the groove 116 so that it snugly engages both the interior surface 120 of the groove, as well as the radially exterior surface 129 of the groove. FIG. 13 shows the general contour of the cam lobe 17, and specifically the contour of the interior surface 120 for engagement with the cam follower to result in the desired linear motion of the adapter block 49 in response to rotation of the shaft 21. A portion of the groove 116 with the outer surface 124 conforming to the configuration of surface 120 is also depicted in FIG. 13.

According to the method of the present invention, the machine 10 is used to cut either an external notch or an internal notch in a selected tubular T. Various notches may be cut in the external surface of various sized tubulars simply by changing out and properly orienting the electrode so that its tip surface 23 will be planar with the external surface ES of the tubular to be notched. When cutting an internal notch, the base 12 as shown in FIG. 1 may be replaced with a new base 12A. An electromagnet 11 optionally may be energized for securing the position of the base in place either on the external surface of the tubular or within the tubular T for cutting an internal notch.

Prior to cutting a notch, the adjustment screws 84 and 86 as shown in FIGS. 7 and 8 may be unthreaded such that, with no fluid pressure being applied to clamp 70, the electrode 22 will fall by gravity with respect to electrode head 20. By terminating pneumatic pressure to the clamp 70, the electrode 22 is thus free to drop so that its end surface 23 moves into planar engagement with the surface of the tubular T to be notched. The adjustment screws 84 and 86 may then be sufficiently tightened so that very little movement of bar 82 by clamp 70 is required to secure the electrode 22 in place on the head 20. Once the adjustment screws are properly set, the operator may activate one of the controls 29 so that pneumatic pressure is supplied to the clamp 70, thereby securing the electrode 22 relative to the head 20. The clamp 70 may have various configurations intended for receiving pneumatic pressure to supply a mechanical force to an adjacent object, such as bar 82. An exemplary pneumatic clamp is the Model P006TR clamp manufactured by Firestone Industrial Products Co.

Once the electrode is properly positioned on the tubular (and with the clamp 70 activated and the electrode raised by motor 14), an operator at control panel 27 may activate one of the controls 29 for discontinuing pneumatic pressure to the pneumatic clamp 70. The release of pressure to the clamp 70 will thus allow the end surface 23 of the electrode 22 to fall slightly by gravity into planar engagement (or as close to planar engagement as is possible) with the surface of the tubular to be notched. When air is again supplied to the clamp 70, the electrode 22 will be fixedly positioned on the head 20 for properly cutting a notch. Once the position of the electrode 22 is fixed on the head 20 by clamp 70, the electrode 22 remains in that fixed position until the pneumatic pressure to clamp 70 is removed. The electrode 22 thus desirably does not move with respect to the head 20 in response to a spring or other biasing member.

The operator at control panel 27 may then use one of the controls 29 to activate the motor 14, thereby raising the electrode a preselected distance off the surface of the tubular to be cut. In an exemplary embodiment, the raised and lowered position of the electrode may be monitored by an encoder 140, as generally shown in FIG. 4, which monitors rotation of shaft 21. Shaft rotation may thus be used to determine the elevation of the electrode from a O position corresponding to the electrode face being in planar engagement with the surface to be notched. The elevation of the electrode from this O position may be displayed to the operator in real time on a screen (not shown) adjacent the control panel. The linear translator thus converts a selected rotation of a motor shaft, which is sensed by encoder 140, into a predetermined axial movement of the head 20 and thus the electrode 22. A suitable motor, gear reducer, and encoder for this purpose is the Model 1624E0125123+16\51670+ HEM1624E16 assembly manufactured by Micro Mo.

The operator may thus initially raise the head 20 so that the end surface 23 of the electrode 22 will be, for example, 0.020 inches off the surface to be notched. The operator may then activate one of the controls 29 for supplying a washing fluid or coolant for the cutting operation, with this fluid flowing through line 34 and the support block 18 then out the port 71 in the electrode holder or head 20, as previously described. The operator may then activate the transformer 25 for supplying high power pulses to the electrode 22. An electronics package within the operator station 27 and controls 29 may be used, for example, to supply a series of pulses to the electrode 22 each having a relatively short and selected variable duration, with the pulses being separated by a short delay between pulses. Thereafter, the electronics package within the control panel may automatically activate the motor 14 for lowering the electrode a selected distance, e.g., 0.002 inches below its previous position. After a selected number of pulsing and lowering operations, the electrode 22 may be automatically raised to a position such that the tip 23 is raised substantially from the surface to be cut, so that fluid continually pumped to the head 20 by the pump 33 will more easily wash material out of the cut notch. This sequencing operation may be repeated until the desired depth of cut is obtained. A desired notch cutting depth may thus be input to the electronics package by the operator, and the notch thereafter automatically cut to that desired depth. Once the encoder indicates that the desired notch depth is obtained, the power to the electrode 22 may be disconnected and the motor 14 activated for raising the electrode off the notched surface.

After completing a notch cutting operation in one tubular, all electrical power to the machine 10 may be discontinued, and the machine 10 then removed from within the tubular. The operator may then unthread the bolt 60, thereby allowing the head 20 to drop by gravity out of the cylindrical cavity 56 in the support block 18. The new electrode with a desired tip surface may then be installed by interrupting pneumatic pressure to the clamp 70 and, if necessary, unloosening the adjustment screws 84 and 86 so that the previous electrode 22 drops from the head 20. A new electrode may then be installed, and the bolts 84 and 86 adjusted so that the electrode 22 slides freely downward by gravity with respect to head 20 when pneumatic pressure is not applied to the clamp 70. Electrode head 20 with a new electrode 22 may then be installed on the electrode support block 18, with the pin 63 as shown in FIG. 5 fitting within a selected one of the ports 67, 71, 73, 74, 75, 76, 77, and 78 within the block 66 so that the electrode will be at its desired angular position with respect to the axis of the tubular. It should be understood that the pin 63 and the plurality of ports in the block 66 do not provide for any angular adjustment for the position of the electrode throughout an angular adjustment range. Instead, the electrode head 20 is fixed at a selected angular position within the electrode support block 18. Its fixed angular position may be changed to a new fixed position by removing and reinserting the head 20 in the block 18, but the position of head 20 may not be adjusted within an angular range. Since the operator cannot adjust the electrode to an intermediate position between the ports in block 66, the fixed angular position of the electrode 22 is always precisely known.

Once the head 20 has been fitted at its desired orientation within the support block 18, the adjustment bolt 60 may be rotated to increase or decrease the spacing of the gap 61 (see FIG. 2), thereby raising or lowering the position of the electrode 22 relative to the surface to be cut. By providing a mechanism to vary the radial spacing at the head 20 with respect to support block 18 and thereby altering the gap 61, various electrodes may be used to cut various notches in different tubulars, with the radial spacing of the surface 23 of each electrode being fixed at a desired position relative to base 12.

Although air pressure is preferably used to activate the holder and thereby fix the position of the electrode with respect to the electrode support, other pressurized fluids such as a selected hydraulic oil may be used for this purpose. The coolant for flushing the area where the notch is cut may be any type of liquid suitable for this purpose, and preferably is an EDM oil commonly used in EDM cutting operations.

Additional modifications and alterations to the embodiments and the methods as described herein should now be apparent to one skilled in the art in view of the foregoing disclosure. Various modifications may thus be made in accordance with the teachings of the present invention, which is not restricted to the embodiments discussed herein and shown in the accompanying drawings. The scope of the invention should thus be understood to include all embodiments within the following claims.

What is claimed is:

1. A notch cutting machine for cutting a notch in a surface of an elongate tubular, comprising:

a machine base for engaging the surface of the tubular at a location adjacent where the notch will be cut;

a powered motor mounted on the machine base for rotating a motor shaft;

a shaft encoder for monitoring rotation of the motor shaft;

an electrode support radially movable relative to the base;

a linear translator for moving the electrode support a preselected radial distance in response to a preselected rotation of the motor shaft;

an electrode having an electrode tip surface configured for cutting a preselected notch in the surface of the elongate metal tubular;

an electrode holder for releasably supporting the electrode thereon for selected movement of the electrode with respect to the electrode support for mating engagement of the electrode tip surface with the surface of the elongate metal tubular to be notched and for thereafter securing the electrode with respect to the electrode support; and a power source spaced from the machine base and an electrical conductor line extending between the power source and the machine base for supplying electrical power to the electrode.

2. The notch cutting machine as defined in claim 1, further comprising:

the motor is an electrically powered servo motor.

3. The notch cutting machine as defined in claim 1, further comprising:

an electrode head for supporting the electrode thereon;

the electrode head being selectively positionable in a plurality of fixed orientation positions relative to the electrode support; and a securing member for securing the electrode head in a desired fixed position with respect to the electrode support.

4. The notch cutting machine as defined in claim 3, further comprising:

the electrode head includes a plurality of passageways therein; and the securing member is an elongate member positionable within a selective passageway for securing the position of the electrode head with respect to the electrode support.

5. The notch cutting machine as defined in claim 3, further comprising:

an adjustment pin for radially adjusting the position of the electrode head with respect to the electrode support.

6. The notch cutting machine as defined in claim 1, further comprising:

a gear reducer for interconnecting the motor shaft with the linear translator.

7. The notch cutting machine as defined in claim 1, further comprising:

a pressurized fluid line for supplying pressurized fluid to the electrode holder, such that the application of fluid pressure secures the position of the electrode with respect to the electrode support and the release of fluid pressure releasably guides the electrode for movement with respect to the electrode support.

8. The notch cutting machine as defined in claim 1, wherein the linear translator includes a cam mechanism rotated by the motor shaft for linear movement of the electrode.

9. The notch cutting machine as defined in claim 1, further comprising:

a liquid line for passing a coolant to an area adjacent the tip surface of the electrode for flushing the area where the notch is cut.

10. The notch cutting machine as defined in claim 1, further comprising:

the machine base is sized for positioning within the elongate tubular.

11. The notch cutting machine as defined in claim 1, further comprising:

a magnet for maintaining the machine base in engagement with the surface of the tubular.

12. A notch cutting machine for cutting an elongate linear notch using electrical discharge machining in an interior surface of an elongate metal oilfield tubular, such that the notch may be used to calibrate an oilfield tubular inspection machine, comprising:

a machine base for engaging the interior surface of the tubular at a location adjacent where the notch will be cut;

an electrically powered motor mounted on the machine base for rotating a motor shaft;

an electrode support radially movable relative to the base;

a linear translator including a cam mechanism rotated by the motor shaft for moving the electrode support a preselected linear distance in response to a preselected rotation of the motor shaft;

an electrode having an electrode tip surface configured for cutting a preselected notch in the surface of the elongate metal tubular;

an electrode head for supporting the electrode thereon;

the electrode head being selectively positionable in a plurality of fixed orientation positions relative to the electrode support;

a securing member for securing the electrode head in a desired fixed orientation position with respect to the electrode support;

a fluid pressure responsive electrode holder for releasably supporting the electrode for movement with respect to the electrode head for mating engagement of the electrode tip surface with the interior surface of the elongate metal tubular and for thereafter selectively securing the electrode with respect to the electrode head;

a power source exterior of the elongate metal tubular for supplying electrical power to the electrode;

an electrical line for electrically connecting the power source and the electrode; and a liquid line for passing a coolant to an area adjacent the tip surface of the electrode for flushing the area where the notch is cut.

13. The notch cutting machine as defined in claim 12, further comprising:

an adjustment screw for radially adjusting the position of the electrode head with respect to the electrode support.

14. The notch cutting machine as defined in claim 12, further comprising:

a gear reducer for interconnecting the motor shaft with the linear translator.

15. The notch cutting machine as defined in claim 12, further comprising:

the electrode head includes a plurality of passageways therein; and the securing member is an elongate member positionable within a selective passageway for securing the position of the electrode head with respect to the electrode support.

16. A method of cutting a notch in a surface of an elongate metal tubular, comprising:

selectively positioning a machine base for planar engagement with the surface of the tubular at a location adjacent where the notch will be cut;

mounting a motor on the base for rotating a motor shaft;

movably mounting an electrode support relative to the base;

moving the electrode support a preselected linear distance in response to a preselected rotation of the motor shaft;

providing an electrode having an electrode tip surface configured for cutting a preselected notch in the surface of the elongate metal tubular;

reducing fluid pressure to release the electrode for movement with respect to the electrode support for mating engagement of the electrode tip surface with the surface of the elongate metal tubular;

thereafter applying fluid pressure to secure the electrode with respect to the electrode support;

monitoring rotation of the motor shaft to determine the position of the electrode relative to the surface of the tubular; and supplying electrical power to the electrode to cut the notch.

17. The method as defined in claim 16, further comprising:

an operator responsive controller external of the tubular for automatically activating the motor to periodically raise and lower the electrode with respect to the surface of the tubular to cut the notch, and to terminate lowering of the electrode when the notch has been cut to a selected depth.

18. The method as defined in claim 16, further comprising:

supporting the electrode on an electrode head;

selectively positioning the electrode head in one of a plurality of fixed orientation positions relative to the electrode support; and securing the electrode head in a desired fixed orientation position with respect to the electrode support.

19. The method as defined in claim 16, further comprising:

radially adjusting the position of the electrode head with respect to the electrode support.

20. The method as defined in claim 16, further comprising:

passing a coolant to an area adjacent the tip surface of the electrode for flushing the area where the notch is cut.

21. The method as defined in claim 16, further comprising:

mounting a magnet on the machine base; and energizing the magnet to maintain the machine base in engagement with the surface of the tubular.

* * * * *